United States Patent
Jan (10) Patent No.: US 7,439,960 B2
(45) Date of Patent: Oct. 21, 2008

(54) KEYPAD AND OPERATION METHOD THEREOF

(75) Inventor: Li-Tze Jan, Taipei (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 281 days.

(21) Appl. No.: 11/216,184

(22) Filed: Sep. 1, 2005

(65) Prior Publication Data
US 2007/0046502 A1    Mar. 1, 2007

(51) Int. Cl.
*G09G 5/00* (2006.01)
(52) U.S. Cl. .................. 345/172; 345/168; 361/680; 341/22
(58) Field of Classification Search ............. 341/22, 341/26; 361/680, 686; 345/168, 172
See application file for complete search history.

(56) References Cited

U.S. PATENT DOCUMENTS

| | | | |
|---|---|---|---|
| 5,402,121 A * | 3/1995 | Noorbehesht | 341/26 |
| 6,040,977 A * | 3/2000 | Hoffer | 361/680 |
| 6,174,143 B1 * | 1/2001 | Horski et al. | 417/366 |
| 6,262,716 B1 * | 7/2001 | Raasch | 345/168 |
| 6,545,668 B1 * | 4/2003 | Hayama | 345/172 |
| 7,068,499 B2 * | 6/2006 | Aisenberg | 361/683 |

* cited by examiner

*Primary Examiner*—Timothy Edwards, Jr.
(74) *Attorney, Agent, or Firm*—Harness, Dickey & Pierce P.L.C.

(57) ABSTRACT

A keypad and operation method thereof is provided. In this embodiment, the keypad has pre-established corresponding tables (namely, key-signal tables) specifying key signals corresponding to various input keys on a keypad. A switching control key (i.e. a numeric-lock-key) is provided on the keypad to serve as the control key for switching one of the key-signal tables to another one to be used for retrieving the key signal. Therefore, when an input key (e.g. numeric/character key) is pressed, then a key signal corresponding to the pressed key is obtained directly from the key-signal table, and then is transmitted to the digital device to executing specific action or display. Therefore the problem of numeric locking synchronism between the numeric keypad and the computer keyboard is solved.

21 Claims, 9 Drawing Sheets

TABLE_I

| 210b | / |
|---|---|
| 210c | * |
| 210d | - |
| 210e | 7 |
| 210f | 8 |
| 210g | 9 |
| 210h | + |
| 210i | 4 |
| 210j | 5 |
| 210k | 6 |
| 210l | 1 |
| 210m | 2 |
| 210n | 3 |
| 210o | Enter |
| 210p | 0 |
| 210q | . |

TABLE_II

| 210b | / |
|---|---|
| 210c | * |
| 210d | - |
| 210e | Home |
| 210f | ↑ |
| 210g | Pg Up |
| 210h | + |
| 210i | ← |
| 210j | / |
| 210k | → |
| 210l | End |
| 210n | ↓ |
| 210m | Pg Dn |
| 210o | Enter |
| 210p | Ins |
| 210q | Del |

KEYPAD AND OPERATION METHOD THEREOF

BACKGROUND

1. Field of the Invention

The invention relates to a keypad and its operation method, and in particular to a keyboard having several input keys and several sets of key-signal tables of the corresponding key signals, so that when a input key is pressed, the corresponding key signal is obtained from one of the corresponding key-signal tables, and is transmitted to the digital device to execute the specific action or for display required.

2. Related Art

In consideration of compactness and miniaturization, the separate set of numeric keys on the right side of the ordinary desk top keyboard is omitted for the notebook computers, and only the composite key set composed of the keys of all the numbers and a part of the characters remains. However, such a composite key set replacing the purely numeric keys is not quite convenient. Therefore, most of the users attach an additional numeric keypad to facilitate the input of numbers. For the computer users required to do a large amount of numeric input, the numeric keypad is indispensable. However, numerous problems frequently arise in the actual application of the numeric keyboard. This phenomenon is particularly evident when it is utilized in cooperation with the notebook computer.

Usually, when an additionally attached numeric keypad is used for numeric input, it is effective only when the Num Lock modes of the computer and the numeric keypad are ON. However, when the Num Lock function of the additionally attached numeric keypad is activated, the Num Lock function of the computer keyboard is also activated synchronously, which results in the consequences that when the keypad is used to input numbers, the characters of the composite key set can not be input, thus making the numeric keypad less convenient.

Presently, the solution to this problem is to provide driving software in the computer system for the additionally attached numeric keypad. When it is desired to input numbers through the numeric keypad, the driving software is used to activate the Num Lock function so that when the key is pressed it is in the ON state, and upon receiving and executing the corresponding key signal, the Num Lock function is deactivated immediately, so that the Num Lock function is in the OFF state. However, the application of this method involves the complicated installation process of the driving software, and it must also ensure that the driving software is compatible with the original system software in the computer. Furthermore, sometimes the original driving software may be replaced by the additionally installed system software. As such, the application of the method is restricted by the driving software and other program software.

Alternatively, another solution to this problem is to change the contents of the packets transmitted, so that on receiving the packet, the computer enters into the ON state of the numeric lock (Num Lock) function, thus executing the key signal corresponding to the numeric key pressed. In this respect, one of the methods utilized is to switch the computer to the ON state of the Num Lock function for executing the corresponding key signal by making use of the packets containing the Num Lock key signals before and after the transmitted key signal. Another method utilized is to send out a deceiving packet before sending out the packet of the corresponding key signal, so that the computer is in the ON state of the Num Lock function to execute the corresponding key signal. However, in the application of these methods, the computer must first enter into the ON state of the Num Lock function, so as to execute the key signal corresponding to the numeric key pressed. As such, it tends to cause mutual interference between the numeric keypad and the computer and confuse the user.

Though numerous solutions have been proposed to solve the problem created by the synchronism of the numeric locking functions between the numeric keypad and the computer keyboard of the prior art, yet they have met various problems in actual implementation, thus there is still much room for improvement.

SUMMARY OF THE INVENTION

In view of the above-mentioned problems and shortcomings of the prior art, the object of the invention is to provide a keypad and operation method thereof, which is utilized to solve the problem created by the synchronism of the numeric-lock-functions between the numeric keypad and the computer keyboard of the prior art.

Therefore, to achieve the above-mentioned objective, the invention provides a keypad, including: keys and a control member. The control member includes a storage unit for storing key-signal tables, and each of the key-signal tables has the key signals corresponding to the keys, respectively. Among the keys there are provided more than one switching control key, which may be used to select one the key-signal table. When one of the keys is pressed, the key signal corresponding to the pressed key may be obtained from the key-signal table selected.

The control member may be a microprocessor, including a pressed key detection unit, a retrieve unit, and a switching control unit. The pressed key detection unit is used to detect the respective pressed key, and generate the corresponding trigger signal according to the pressed key when the key is pressed. The retrieve unit is connected to a corresponding key-signal table, and is used to retrieve the key signal corresponding to the pressed key from the connected key-signal table according to the trigger signal. When the switching control key is pressed, the switching control unit is used to control the retrieve unit to perform switching of the key-signal table according to the trigger signal.

Some of the keys include a numeric-lock-key and a plurality of input keys, while the switching control key may be a numeric-lock-key or may be a numeric-lock-key in combination with at least one input key.

In the above-mentioned structure, when an input key is pressed, the retrieve unit is used to retrieve the key signal from the corresponding key-signal table according to the trigger signal, and when the switching control key is pressed, the trigger signal is used to trigger and control the retrieve unit to perform the switching of the corresponding key-signal table.

Furthermore, the control member is further provided with a signal transmission unit, which is used to transmit the key signal obtained. The signal transmission unit is utilized to obtain the key signal in a wired (e.g. transmission line) or wireless (e.g. wireless network) manner and transmit it to the digital device utilizing the keypad.

In addition, a state indication device is used to indicate the state of the key-signal table to the retrieve unit, namely, the state of the corresponding key-signal table.

To achieve the above-mentioned objective, the invention provides a keypad operation method, the keypad includes: keys having more than one switching control key, and a storage unit for storing key-signal tables, each of which is provided with the key signals corresponding respectively to the keys. Thus, the operation method includes the following steps: scanning a state of the keys, and switching from one of the key-signal tables to another, to be used for retrieving the key signal when the switching control key is pressed.

The key-signal tables are preset according to the actual requirement and are stored in the storage unit.

To achieve the above-mentioned objective, the invention provides a keypad operation method, suitable for use in a keypad, which includes: keys having more than one switching control key, and a storage unit which stores key-signal tables, each of which is provided with key signals corresponding respectively to the keys. The operation method includes the following steps: scanning a state of the keys, and when one of the keys is pressed, then generating corresponding trigger signal; identifying the pressed keys; when the pressed key is not the switching control key, the key signal corresponding to the key pressed from one of the key-signal tables according to the trigger signal; when the key pressed is the switching control key, switching to another of the key-signal tables to be used for retrieving the key signal according to the trigger signal.

The key-signal tables are preset according to the actual requirement and are stored in the storage unit. Moreover, the key signal thus obtained is transmitted to the digital device utilizing this keypad directly or in a wired (e.g. transmission line) or wireless (e.g. wireless network) manner.

Further scope of the applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given herein below illustration only, and thus are not limitative of the present invention, and wherein.

DETAILED DESCRIPTION OF THE INVENTION

The purpose, construction, features, and functions of the invention can be appreciated and understood more thoroughly through the following detailed description with reference to the attached drawings.

The invention provides a keypad and its operation method. It mainly concerns with establishing a plurality of corresponding tables specifying the relations between the respective input keys and their corresponding key signals. The switching control keys (e.g. Num Lock key) are provided on the keypad as the control key for switching and obtaining the corresponding key-signal table. Therefore, when an input key is pressed (e.g. numeric/character key), the keypad can be used to be obtained directly from the key-signal table the key signal corresponding to the pressed key, then the key signal is transmitted to the digital device (for example, the various computer (e.g. the desktop computer, the flat panel computer), personal data assistant (PDA) or the game player) in control of the keypad for further processing, thus solving the problem created by the synchronism of the numeric-lock-functions between the conventional numeric keypad and computer keyboard.

Figure 1:
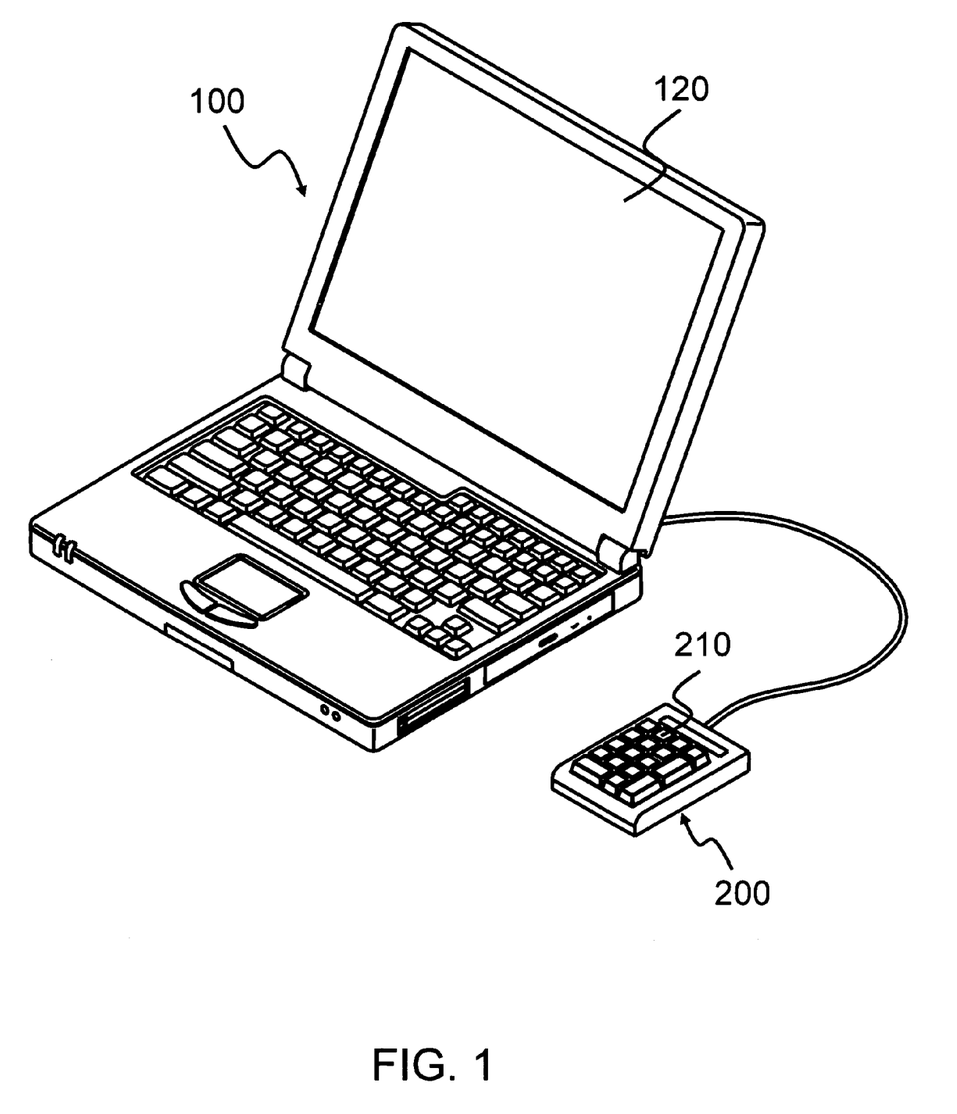
FIG. 1 is a schematic view showing the application of a keypad to the digital device according to an embodiment of the invention.
Figure 2:
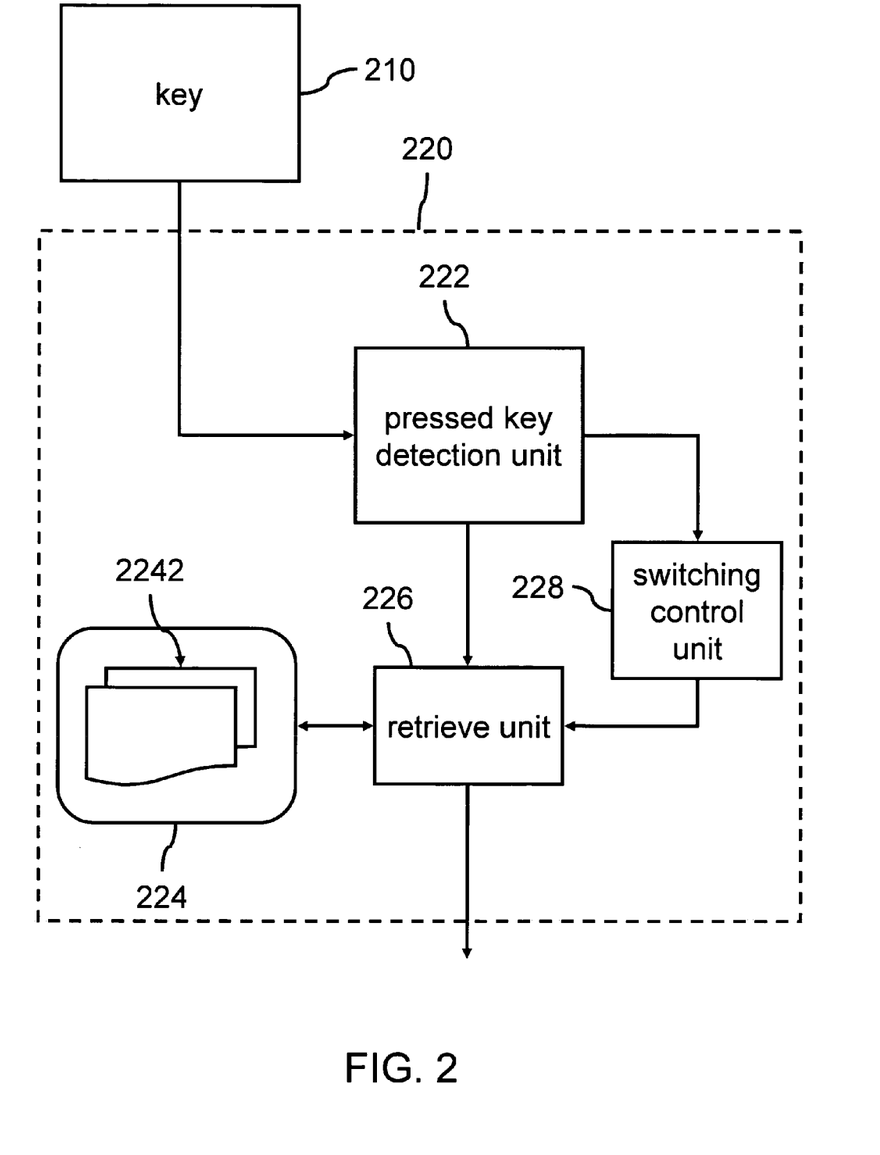
FIG. 2 is a block diagram of the structure of a keypad according to an embodiment of the invention.

Refer to FIGS. 1 and 2, where FIG. 1 is a schematic view showing the application of a keypad to the digital device according to an embodiment of the invention, and FIG. 2 is a block diagram of the structure of a keypad according to an embodiment of the invention.

Herein, a numeric keypad additionally attached to a notebook computer is utilized as an example to explain the operation principle of the keypad of the invention.

As shown in FIGS. 1 and 2, the digital device connected to the numeric keypad 200 is a notebook computer 100. The digital keypad 200 is composed of a plurality of keys 210 and a control member 220. One of these keys may be provided as a switching control key, for example, the numeric-lock-key of the keypad. Herein, the control member 220 may be a microprocessor.

Referring to FIG. 2, the control member 220 includes: a pressed key detection unit 222, a storage unit 224, a retrieve unit 226, and a switching control unit 228. Among them, the pressed key detection unit 222 is used to scan the state of the various keys 210, and identify and determine the pressed key 210. A plurality of key-signal tables 2242 are stored in the storage unit 224, and each of the key signal tables 2242 are provided the key signals corresponding to the various keys 210. When the pressed key detection unit 222 detects that one of the keys 210 except the switching control key is pressed, then it triggers the retrieve unit 226 to retrieve the key signal corresponding to the pressed key 210 from a key-signal table 2242 of the storage unit 224 and provides the key signal to the connected notebook computer 100, which is used to display the corresponding number, symbol or image on its screen 120 according to the key signal. In addition, when the pressed key detection unit 222 detects that the switching control key is pressed, then it triggers the switching control unit 228 to control the retrieve unit 226 to switch to the desired key-signal table 2242. In other words, the storage unit 224 can be divided into a plurality of storage blocks to store a key-signal table 2242 respectively, while the retrieve unit 226 can be connected to one of the storage blocks When a key 210 except the switching control key is pressed, the retrieve unit 226 is used to retrieve the key signal corresponding to the pressed key 210 from the key-signal table 2242 in the connected storage block. When the switching control key is pressed, the switching control unit 28 is used to control the retrieve unit 226 to switch and connect to another storage block.

Figure 3:
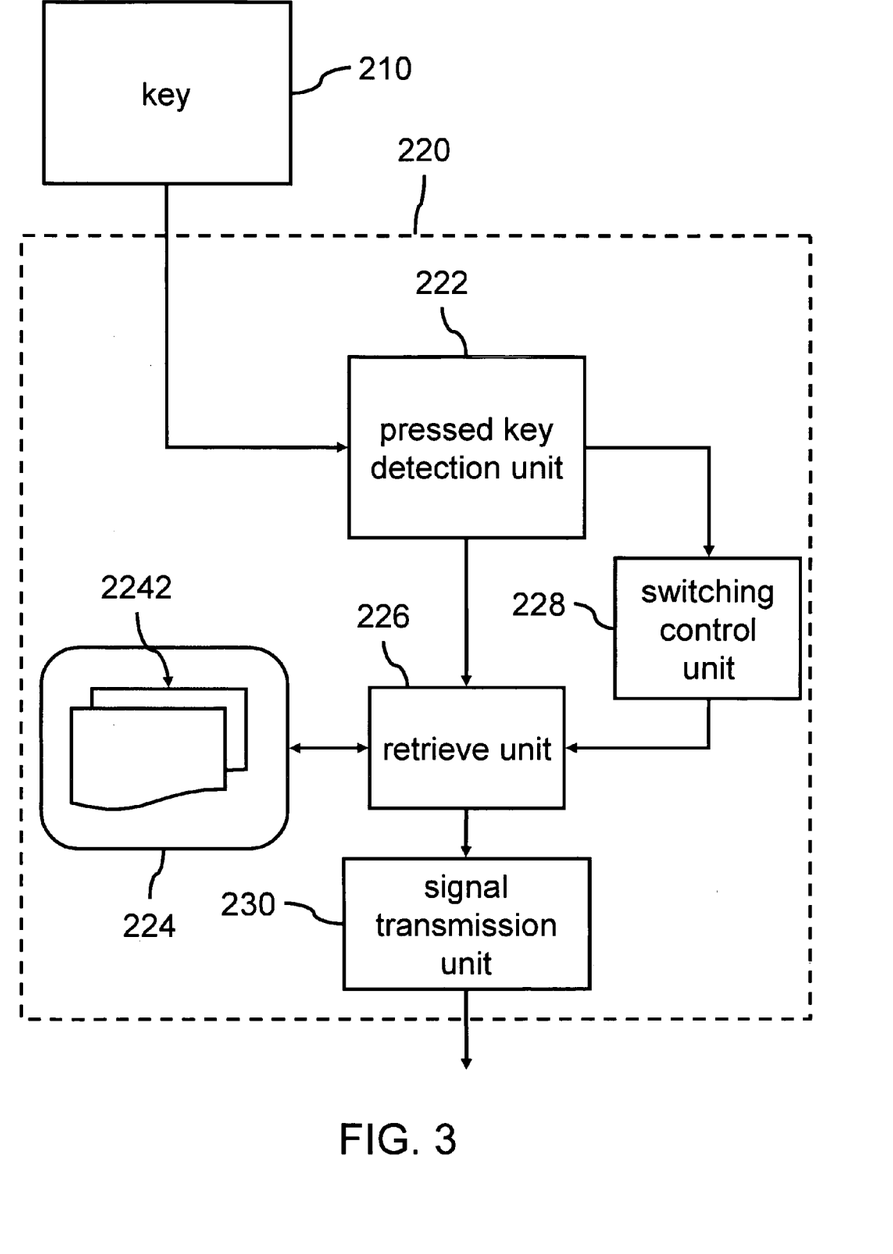
FIG. 3 is a block diagram of the structure of a keypad according to another embodiment of the invention.

Furthermore, as shown in FIG. 3, the control member 220 may further include a signal transmission unit 230, which is used to transmit the key signal thus obtained to the notebook computer 100 to which it is connected.

Herein, the numeric keypad mentioned above is utilized to describe further the control operation of the numeric keypad.

Figure 4:
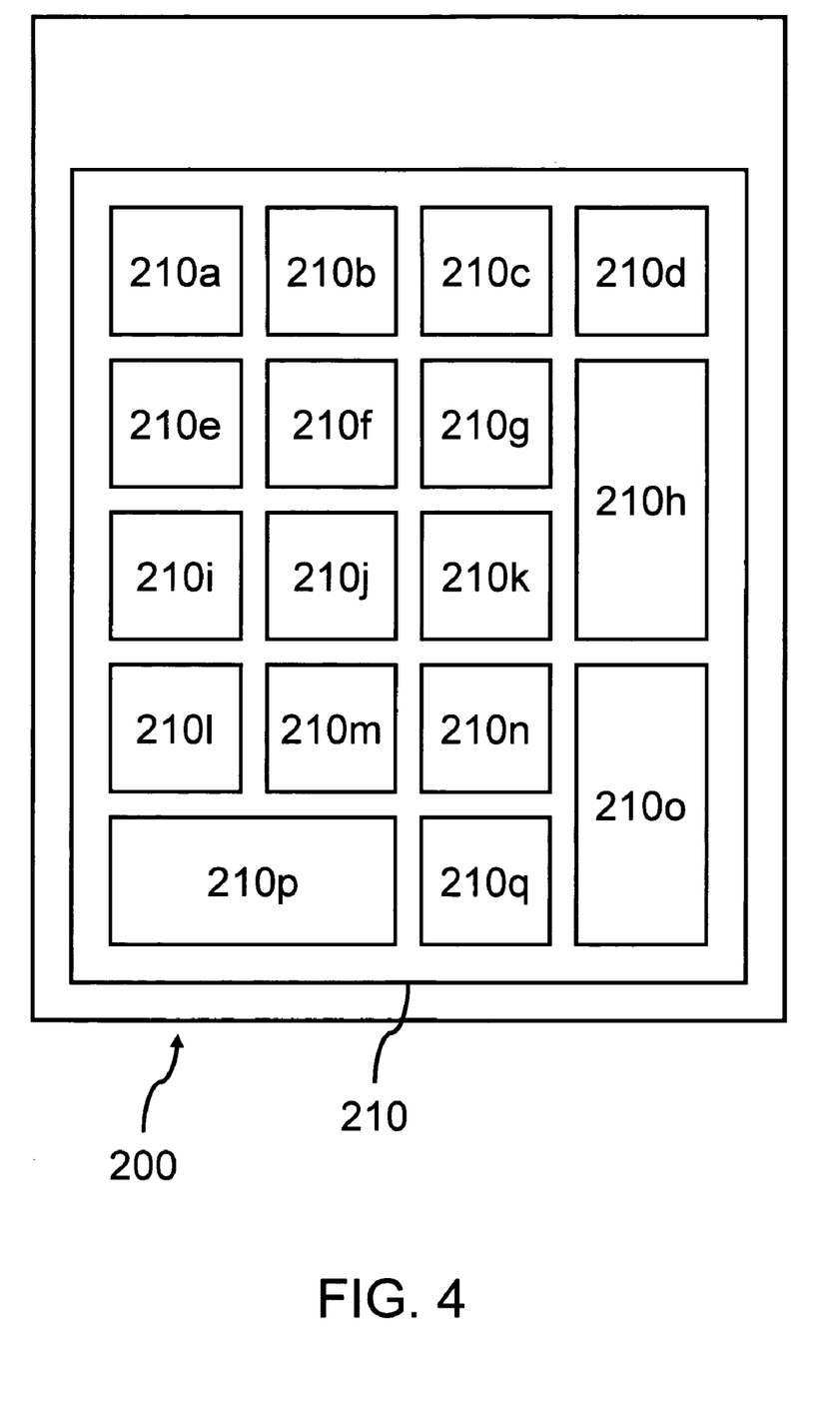
FIG. 4 is an upward view showing an embodiment of a keyboard in FIG. 3.
Figure 5:
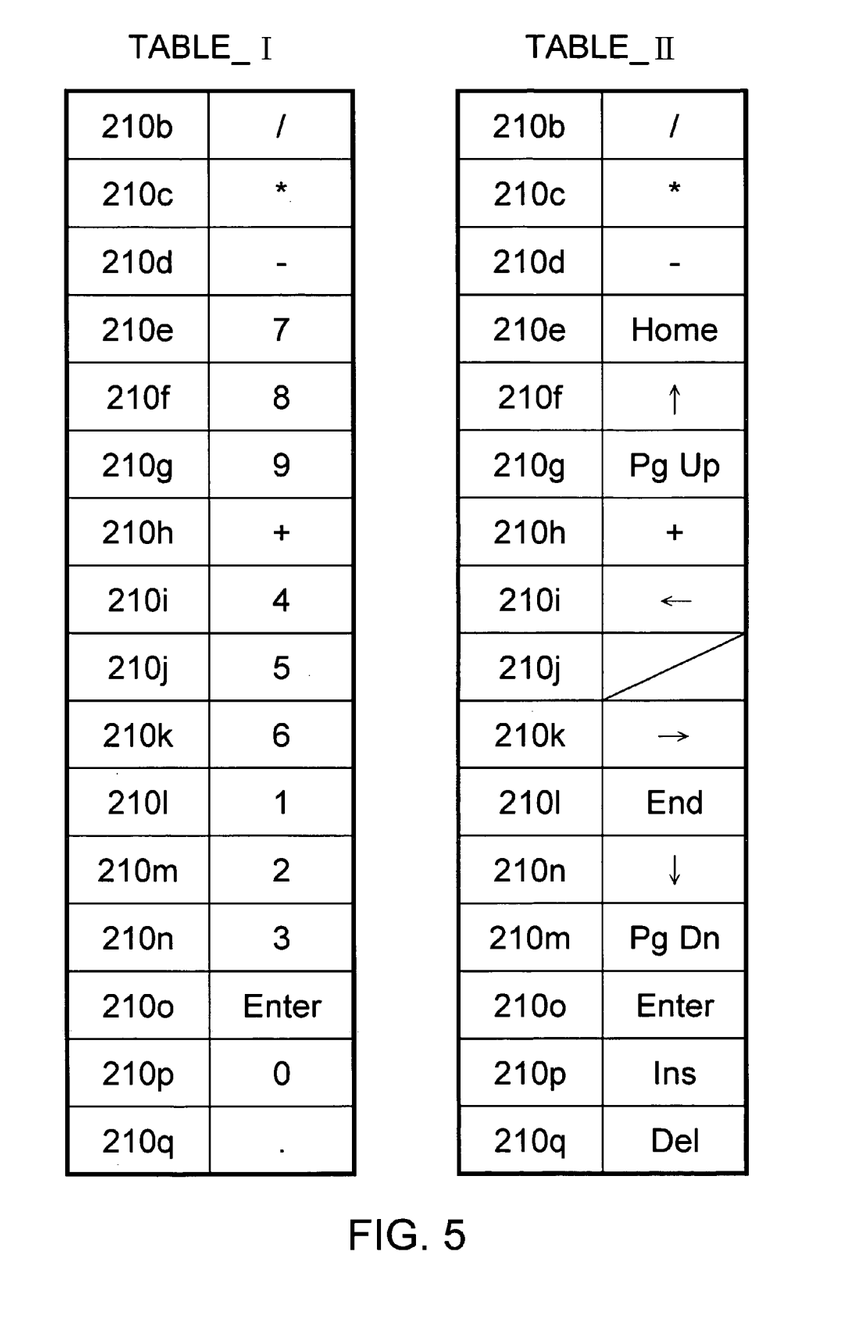
FIG. 5 is a schematic view showing an embodiment of the key-signal table corresponding to the keys of FIG. 4.

Refer to FIGS. 4 and 5, where FIG. 4 is upward view showing an embodiment of keyboard according to the invention, and FIG. 5 is a schematic view show in the key-signal table corresponding to the keys in FIG. 4.

As shown in FIG. 4, the numeric keypad 200 is composed of 18 keys (210), including a numeric-lock-key 210a (namely, a switching control key) and a plurality of input keys 210b-210q. The storage unit 224 is provided with a first and a second key-signal table, TABLE_I and TABLE_II, as shown in FIG. 5. On the left side of the contents of TABLE_I and TABLE_II are the respective input keys 210b-210q, while on the right side are the key signals corresponding to the respective input keys 210b-210q. These key signals can be classified into action signal and/or display signal according to their attributes. Namely, when the key signal is an action signal, then the digital device utilizing the numeric keypad 200 will perform the corresponding action (e.g., cursor forward, cursor backward, change page) upon receiving the particular key signal. On the contrary, when the key signal is a display signal, then upon receiving the signal, the digital device utilizing the numeric keypad 200 will display on its screen the corresponding symbol or numeric (e.g.: numeric "0"-numeric "9", or symbol "+", symbol "−", symbol "*", and symbol "/").In the first key-signal table TABLE_I, the signals generated by the input key 210e-210g, 210i-210n, 210p, and 210q are the display signals, and the signal generated by the input key 210o is an action signal, thus the input keys 210b, 210c, 210d, and 210h are used to generate the display signal or action signal according to the application program executed by the digital device utilizing the numeric keypad 200 (namely, when the digital device executes the mathematical operations, the application program is used to execute the mathematical operations according the key signals, otherwise, the digital device displays the operation symbols of the mathematical operations). Moreover, in the second key signal TABLE_II, the attributes of the input keys 210b, 210c, 210d, and 210h are the same as those in TABLE_I, thus the signals generated by the input keys 210e-210g, 210i, 210k-210q are the action signals, while the input key 210j does not generate any key signals (namely, it is not active). Though in the above description, 18 keys are utilized to explain the relations between the respective keys and the corresponding key signals they produce, however, the invention is not by any way restricted to this. Other keys and corresponding numbers, symbols and/or actions may also be utilized.

For more detailed description of the operation of the keypad, refer to FIGS. 1, 3, 4, and 5. Supposing that the retrieve unit 226 is now connected to the corresponding first key-signal table TABLE_I, when the key 210b is pressed by the user to execute input, the pressed key detection unit 222 is used to detect the pressed key 210b, thus triggering the retrieve unit 226 to retrieve the corresponding key signal "/" from the first key-signal table TABLE_I, then the signal transmission unit 230 is used to transmit the key signal "/" to the notebook computer 100, so that the symbol "/" is displayed on the screen of the notebook computer (or when executing the mathematical operations, the division operation is performed according to the key signal "/"). Similarly, if the key 210f is pressed, then the numeric "8" is displayed on the display screen 120; and if the key 210o is pressed, then the notebook computer 100 is used to perform the input action according to the key signal 'Enter'. Thus the actions performed by the notebook computer 100 in response to pressing other input keys may be inferred in the similar manner as described above. In addition, when it is desired to execute the action or display of the key signal as listed in the second key signal TABLE_II, the pressed key detection unit 222 is used to detect the input from the numeric-lock-key 210a, thus triggering the switching control unit 228 to control the retrieving unit 226 in switching to the corresponding second key signal TABLE_II. Then, similarly, when any of the input keys 210b-210q is pressed, the pressed key detection unit 222 is used to detect the input of the pressed input key, thus triggering the retrieve unit 226 to retrieve the corresponding key signal from the second key signal TABLE_II in the storage unit 224. Then the signal transmission unit 230 is used to transmit the key signal thus obtained to the notebook computer 100, to execute the corresponding action or display.

Figure 6:
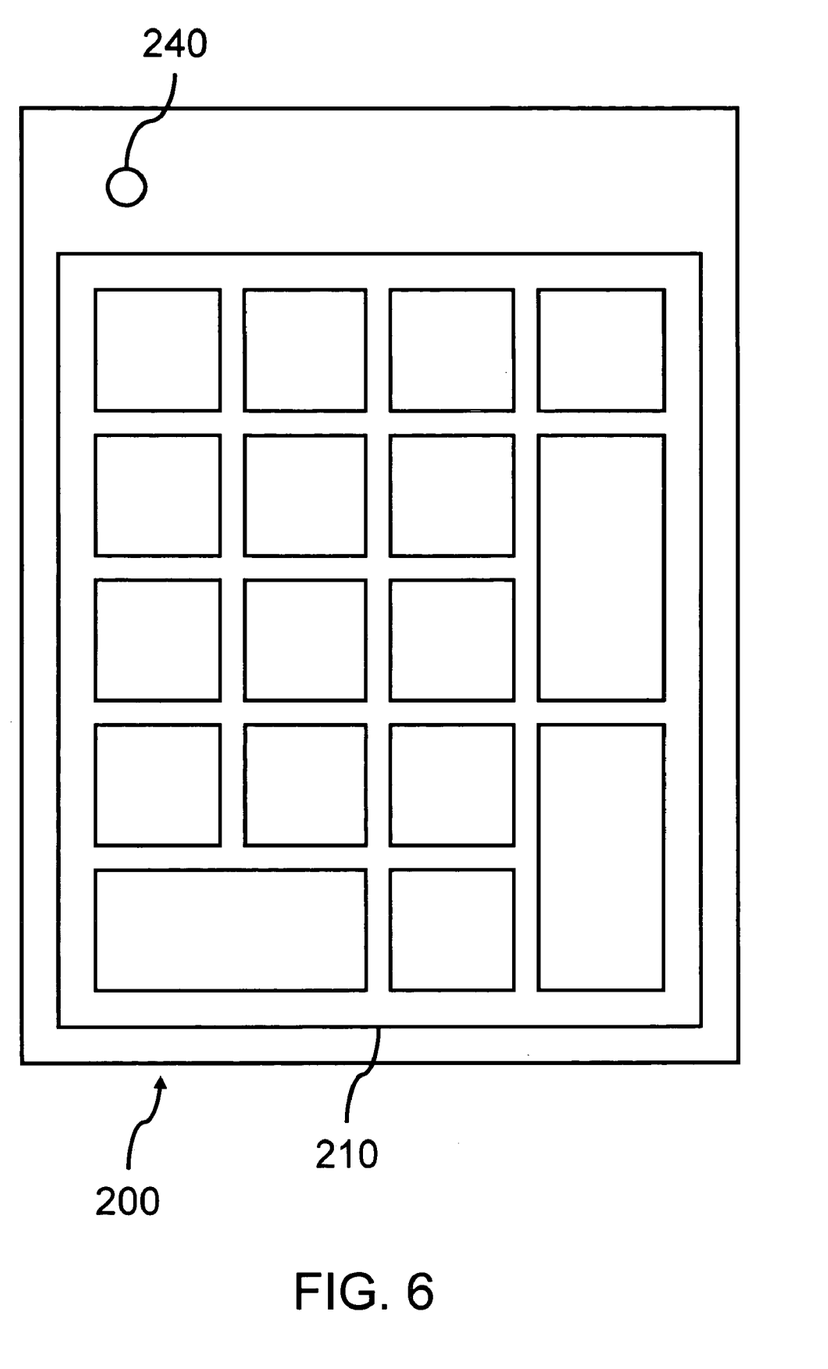
FIG. 6 is an upward view showing another embodiment of keypad of FIG. 3.

In the above description, only two key-signal tables stored in the storage unit are taken as an example for explanation and understanding convenience. However, in practice, a plurality of key-signal tables may be stored in the storage unit (e.g. 3 key signal tables, 4 key-signal tables . . . or N key-signal tables, where N is a positive integer). When key-signal tables are provided, the respective key signal table may be switched in order by repeatedly pressing the switching control key, or by pressing the switching control key in cooperation with pressing other key. Moreover, a state indication device 240 may be utilized to indicate the present switching state of the key-signal table as shown in FIG. 6, wherein the state indication device as shown is composed of the numeric-lock-indication lamps similar to those on the convention numeric keypad.

Figure 7:
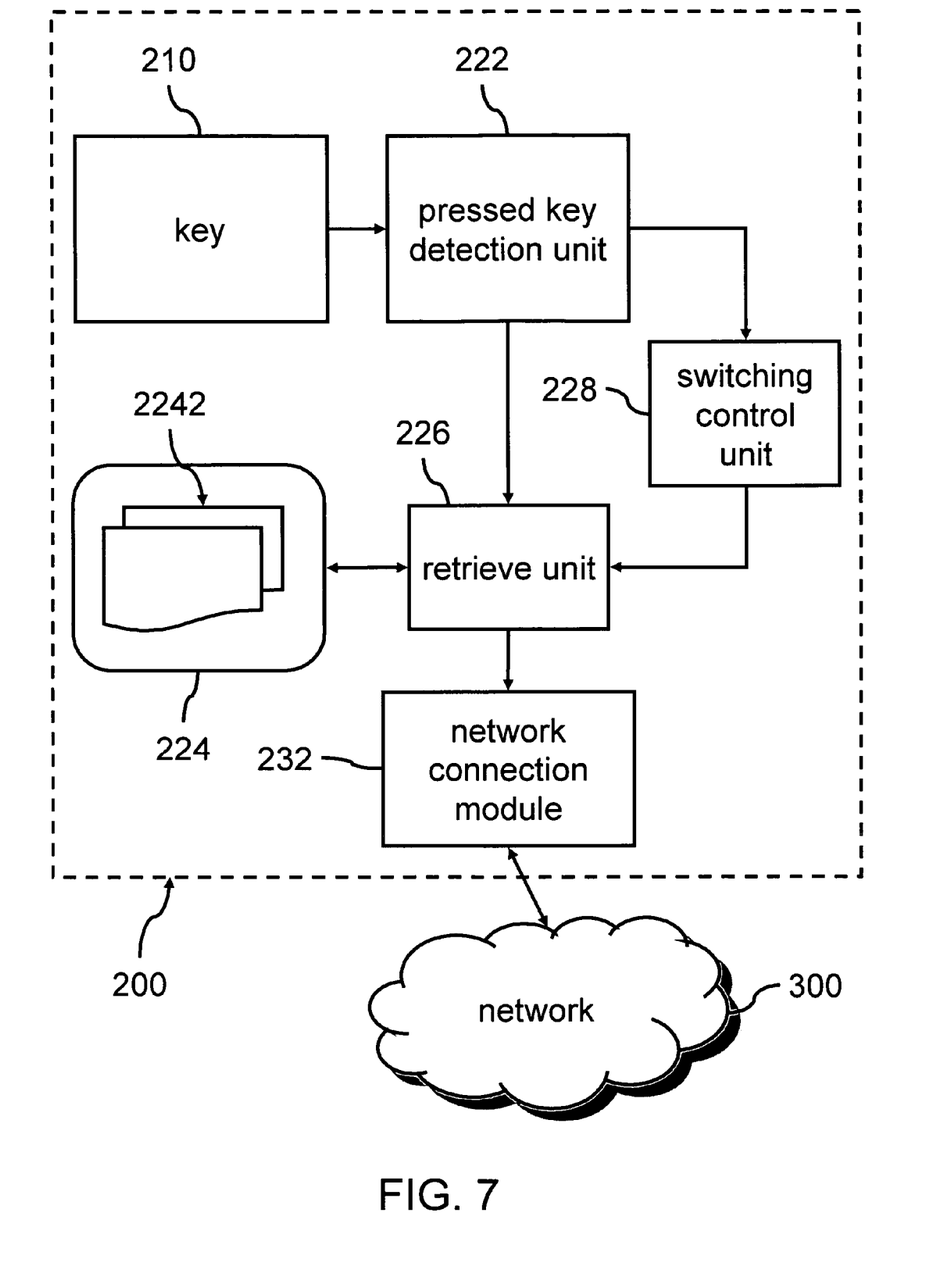
FIG. 7 is a block diagram of the structure of keypad according to yet another embodiment of the invention.

In this embodiment, the signal transmission unit 230 may be a connection interface connected to a notebook computer through a transmission connection, or it may be a network connection module 232 connected to the notebook computer through a network 300 as shown in FIG. 7. The network connection module may be a network module (e.g. an Ether network module and the like) or a wireless transceiver module (e.g. RF transceiver module, BlueTooth wireless transceiver module, wireless local area network (WLAN) transceiver module, or the series of the wireless transceiver modules compatible with the 802.11x standard of IEEE (e.g. the 802.11a standard, the 802.11b standard, the 802.11g standard, the 802.11h standard, the 802.11i standard, or the combination of more than two 802.11x series standards)).

Furthermore, though in the above-mentioned embodiment the numeric keypad connected to the notebook computer through a connection wire is utilized to explain its operation, however, in practice, the keypad of the invention may be connected to the various digital devices by wired or wireless means, or it may even be used as an input device and installed directly on the digital device without departing from the spirit or scope of the invention.

Figure 8:
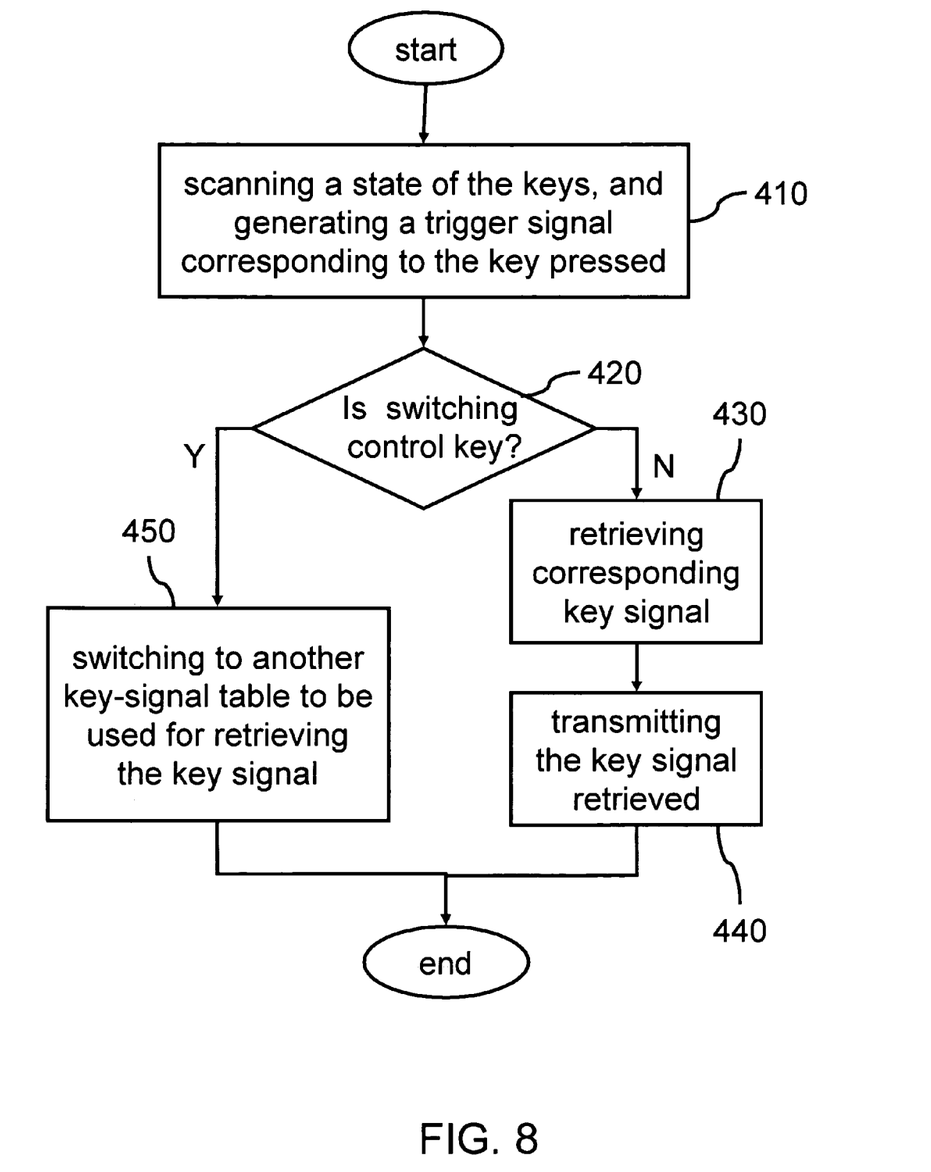
FIG. 8 is a flowchart of the keypad operation method according to another embodiment of the invention.

Summing up the above, the keypad according to the invention can be implemented through a related corresponding method. Refer to FIGS. 3 and 8, where FIG. 3 is a block diagram of the structure of a keyboard according to an embodiment of the invention, and FIG. 8 is a flowchart of the keypad operation method according to another embodiment of the invention. As shown in FIG. 8, the keypad operation method according to yet another embodiment of the invention includes the following steps. Firstly, scanning the states of the various keys 210 by a pressed key detection unit 222, and when detecting the pressing of a key, generating a trigger signal corresponding to the pressed key (step 410). If the pressed key is one of the keys other than the switching control key (step 420), then triggering the retrieve unit 226 with the corresponding trigger signal to retrieve a key signal corresponding to the pressed key in the key-signal table 2242 of the storage unit 224 (step 420), and then forwarding the retrieved key signal to a digital device through a signal transmission unit 230 for executing the corresponding display or action according to the key signal (step 430). Otherwise, if the pressed key is the switching control key (step 420), then triggering the switching control unit 228 with the trigger signal to control the retrieve unit 226 for switching to the corresponding key-signal table 2242, namely, controlling the retrieve unit 226 to switch and connect correspondingly to another key-signal table (step 440).

Figure 9:
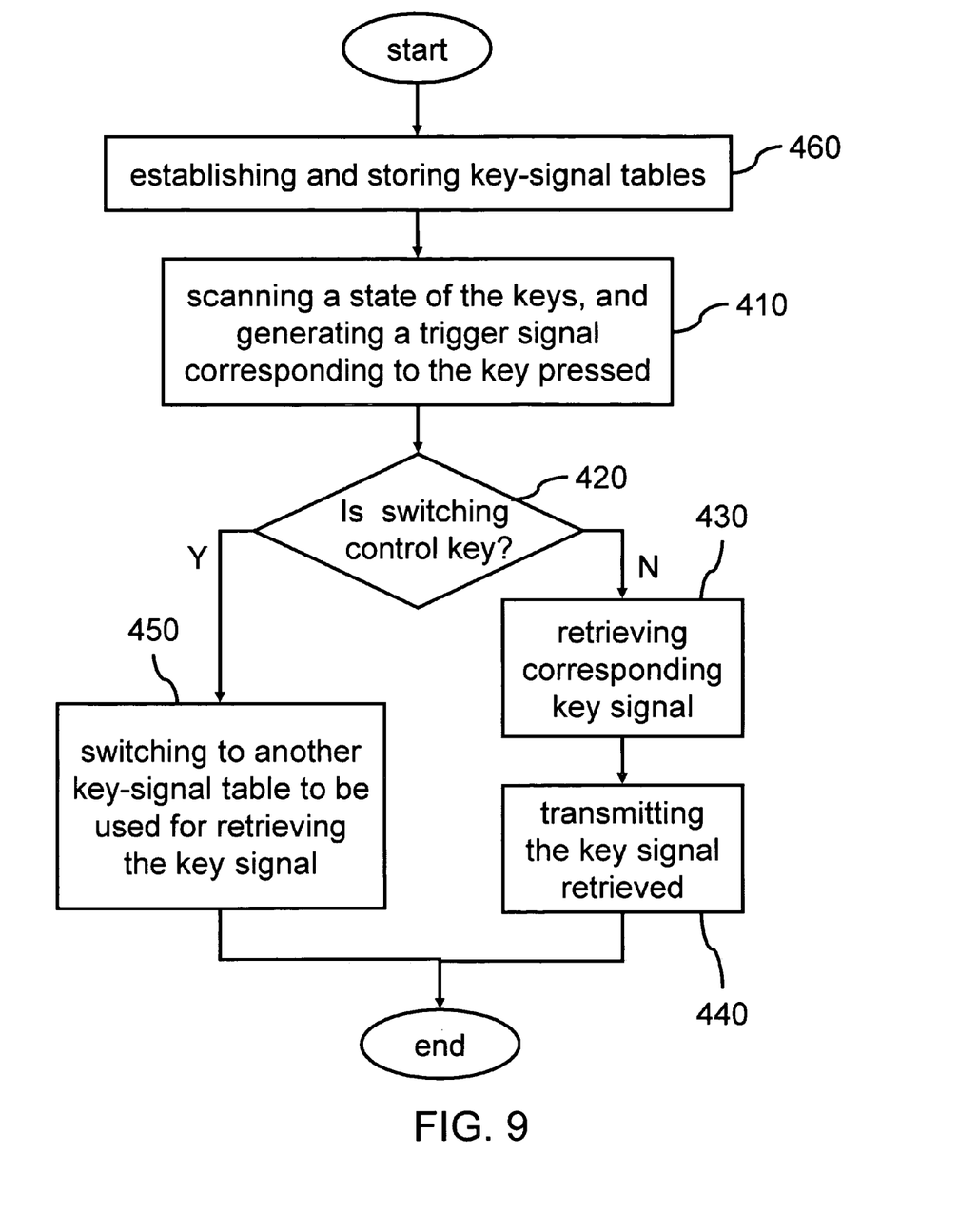
FIG. 9 is a flowchart of the keypad operation method according to yet another embodiment of the invention.

Furthermore, a plurality of key-signal tables 2242 may be established in advance and stored in the storage unit 224 for the application later depending on the actual requirements (step 460), as shown in FIG. 9.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A keypad, for being connected to a digital device, the keypad comprising:
   a plurality of keys, at least one of which is at least one switching control key; and
   a control member, having a storage unit for storing a plurality of key-signal tables each which has a plurality of key signals corresponding to the keys, respectively;
   wherein when one of the keys is pressed and the pressed key acts as the switching control key, the control member selects the key-signal table that is used for obtaining the key signal corresponding to the pressed key; and
   when one of the keys is pressed and the pressed key does not act as the switching control key, the control member retrieves the key signal corresponding to the key pressed from the selected one of the key-signal tables and transmits the key signal retrieved to the digital device such that the digital device performs function operation corresponding to the key signal.

2. The keypad of claim 1, wherein the keys comprises a numeric-lock-key and a plurality of input keys, and the switching control key is the numeric-lock-key.

3. The keypad of claim 1, wherein the keys comprises a numeric-lock-key and a plurality of input keys, and the switching control key functions as the numeric-lock-key in cooperation with at least one of the input keys.

4. The keypad of claim 1, wherein the control member is a microprocessor.

5. The keypad of claim 1, wherein the control member further comprising:
   a pressed key detection unit, for detecting the keys and generate a trigger signal corresponding to the key pressed;
   a retrieve unit, connected correspondingly to one of the key-signal tables, for retrieving the key signal corresponding to the key pressed from the key-signal table connected according to the trigger signal; and
   a switching control unit, for controlling the retrieve unit in switching to another of the key-signal tables, which is connected correspondingly, according to the trigger signal when the switching control key is pressed.

6. The keypad of claim 5, wherein the keys comprises a numeric-lock-key and a plurality of input keys, and the switching control key is the numeric-lock-key.

7. The keypad of claim 5, wherein when one of the input keys is pressed, the retrieve unit retrieves the key signal corresponding to the input key pressed from the key-signal table, which is connected correspondingly, according to the trigger signal.

8. The keypad of claim 5, wherein the keys comprises a numeric-lock-key and a plurality of input keys, and the switching control key functions as the numeric-lock-key in cooperation with at least one of the input keys.

9. The keypad of claim 8, wherein when one of the input keys is pressed, the retrieve unit retrieves the key signal corresponding to the input key pressed from the key-signal table, which is connected correspondingly, according to the trigger signal; and when the numeric-lock-key and the cooperating input key are pressed simultaneously, the switching control unit controls the retrieve unit in switching to the another of the key-signal tables, which is connected correspondingly, according to the trigger signal.

10. The keypad of claim 5, wherein the control member further comprising a signal transmission unit, for transmitting the key signal obtained.

11. The keypad of claim 10, wherein the signal transmission unit is a connection interface, for transmitting the key signal obtained through a transmission line.

12. The keypad of claim 10, wherein the signal transmission unit is a network connection module, for transmitting the key signal obtained through a network.

13. The keypad of claim 1, further comprising:
    a state indication device, for indicating a state of the key-signal table to which the retrieve unit is correspondingly connected.

14. A keypad operation method, suitable for use in a keypad to be connected to a digital device, the keypad including a plurality of keys having at least one switching control key and the keypad storing a plurality of key-signal tables, each of which is provided with a plurality of key signals corresponding respectively to the keys, the method comprising:
    scanning a state of the keys, and
    when the switching control key is pressed, switching from one of the key-signal tables to another, to be used for retrieving the key signal which corresponds to the key pressed to be transmitted into the digital device to perform an action corresponding to the key signal retrieved.

15. The keypad operation method of claim 14 wherein before the step of scanning a state of the keys, further comprising the following step of: establishing and storing the key-signal tables.

16. A keypad operation method, suitable for use in a keypad to be connected to a digital device, the keypad including a plurality of keys having at least one switching control key and the keypad storing a plurality of key-signal tables, each of which is provided with a plurality of key signals corresponding respectively to the keys, the method comprising:
    scanning a state of the keys;
    generating a trigger signal corresponding to the key pressed when one of the keys is pressed; and
    identifying the key pressed;
    wherein when the key pressed is not the switching control key, retrieving the key signal corresponding to the key pressed from one of the key-signal tables according to the trigger signal, to be transmitted into the digital device to perform function operation corresponding to the key signal retrieved; and
    when the key pressed is the switching control key, switching to another key-signal table to be used for retrieving the key signal according to the trigger signal.

17. The keypad operation method of claim 16 wherein before the step of scanning a state of the keys, further comprising:
    establishing and storing the key-signal tables.

18. The keypad operation method of claim 16 wherein after the step of retrieving the key signal corresponding to the key pressed from one of the key-signal tables according to the trigger signal, further comprising the following step of:

transmitting the key signal retrieved.

19. The keypad operation method of claim 16 wherein when the keys have a numeric-lock-key which is the switching control key and a plurality of input keys, the step of when the key pressed is not the switching control key, retrieving the key signal corresponding to the key pressed from one of the key-signal tables according to the trigger signal is the following step of when the key pressed is one of the input keys, retrieving the key signal corresponding to the input key pressed from the key-signal table according to the trigger signal.

20. The keypad operation method of claim 16 wherein when the keys have a numeric-lock-key and a plurality of input keys, and the switching control key functions as the numeric-lock-key in cooperation with at least one of the input keys, the step of when the key pressed is not the switching control key, retrieving the key signal corresponding to the key pressed from one of the key-signal tables according to the trigger signal is the following step of when the key pressed is one of the input keys, retrieving the key signal corresponding to the input key pressed from the key-signal table according to the trigger signal.

21. The keypad operation method of claim 16 wherein when the keys have a numeric-lock-key and a plurality of input keys, and the switching control key functions as the numeric-lock-key in cooperation with at least one of the input keys, the step of when the key pressed is the switching control key, switching to another of the key-signal tables to be used for retrieving the key signal according to the trigger signal is the following step of when the numeric-lock-key and the cooperating input key are pressed simultaneously, switching to the another of the key-signal tables to be used for retrieving the key signal according to the trigger signal.

* * * * *